United States Patent Office 3,402,069
Patented Sept. 17, 1968

3,402,069
SILICON-CONTAINING POLYMERS
Ernest Bryson McCall, Llangollen, Brian Beard Millward, Wrexham, and Alan Jeffrey Neale, Llangollen, Wales, assignors to Monsanto Chemicals Limited, London, England, a British company
No Drawing. Filed June 1, 1965, Ser. No. 460,466
Claims priority, application Great Britain, June 2, 1964, 22,744/64
20 Claims. (Cl. 117—126)

ABSTRACT OF THE DISCLOSURE

Silicon-containing aromatic polymers are produced by the thermal condensation of silicon-containing aromatic compounds with polyfunctional aromatic sulfonyl halides, with the elimination of sulfur dioxide and hydrogen halide. The polymers can be reinforced with fibrous material to give articles of high mechanical strength capable of service for prolonged periods at high temperatures.

---

This invention relates to silicon-containing polymers, more particularly to silicon-containing aromatic polymers having high thermal stability.

In modern technology there is a demand for materials that can be molded or otherwise shaped to give articles having high structural strengths and high resistance to thermal and oxidative deterioration when subjected to elevated temperatures. A new class of materials having such properties is provided by the present invention.

The new materials of the invention are silicon-containing aromatic polymers that can be produced by a process in which an aromatic polysulfonyl halide (that is to say an aromatic sulfonyl halide containing at least two sulfonyl halide groups each linked to a nuclear carbon atom) is heated with a silicon-containing aromatic compound having replaceable nuclear hydrogen atoms under such conditions that sulfur dioxide and a hydrogen halide are evolved, the number of mols of the silicon-containing aromatic compound per mol of the aromatic sulfonyl halide being not more than the number of sulfonyl halide groups in the aromatic sulfonyl halide.

The polymers include materials of different types, but particularly valuable are polymers that are infusible and insoluble and that can be used in the production of reinforced laminates.

The silicon-containing starting material, that is to say the aromatic substance having replaceable nuclear hydrogen atoms, can be selected from a range of materials of various degrees of molecular complexity, including monomeric substances, for example simple aromatic esters of orthosilicic acid such as for instance tetraphenyl orthosilicate, and substances that already possess a structure that is relatively highly polymeric.

In preferred instances, the aromatic polysulfonyl halide (the other starting material) contains two sulfonyl halide groups. The aromatic polysulfonyl halides usually used are the sulfonyl chlorides or sulfonyl bromides, and of these the chlorides are preferred. Typical aromatic polysulfonyl halides are the benzenedisulfonyl halides and the diphenyl ether disulfonyl halides.

A temperature of not less than about 175° C. is generally required for a practical reaction rate in the process, and preferred temperatures are generally higher than this, for example in the range of about 200° to about 375° C., especially in the range of about 250° to about 350° C.

The aromatic sulfonyl halide can be a compound containing one or more aromatic nuclei, and where it contains more than one nucleus, the sulfonyl halide groups can be linked to carbon atoms of the same nucleus or to carbon atoms of different nuclei. A preferred class of polynuclear aromatic sulfonyl halides are those that contain from two to four aromatic nuclei arranged in a sequence, successive nuclei in the sequence being linked directly or through an oxygen or sulfur atom.

The nucleus or nuclei in the sulfonyl halide can be carbocyclic or heterocyclic, but carbocyclic nuclei, such as for instance benzene or naphthalene nuclei, are usually preferred, although high thermal stability is also associated with nuclei having a heterocyclic ring fused to one or more carbocyclic rings, for example dibenzothiophen or dibenzofuran nuclei.

The nucleus or nuclei of the aromatic sulfonyl halide can contain one or more substituents in addition to the sulfonyl halide groups. Such a substituent can be selected from a range of atoms or groups, including for instance halogen atoms, alkyl groups and alkoxy groups. Usually, however, the polymers having the highest thermal stabilities are those derived from unsubstituted aromatic sulfonyl halides or from aromatic sulfonyl halides having only one or more fluorine or chlorine atoms as additional nuclear substituents.

In general, the preferred sulfonyl halides are sulfonyl halide derivatives of benzene; naphthalene; polyaryls, especially polyphenyls such as for instance biphenyl and terphenyl; aryl ethers, especially phenyl ethers, for example diphenyl ether and the bis(phenoxy)benzenes; aryl sulfides, for example diphenyl sulfides or the dinaphthyl sulfides, dibenzothiophene; and dibenzofuran.

Specific examples of these aromatic sulfonyl halides are: benzene 1,3-disulfonyl chloride; benzene 1,3-disulfonyl bromide; 2, 4, 5, 6-tetrachlorobenzene-1,3-disulfonyl chloride; naphthalene-1,5-disulfonyl chloride; naphthalene - 2,7 - disulfonyl chloride; naphthalene - 1,3,6 - trisulfonyl chloride; diphenyl-4,4'-disulfonyl chloride; diphenyl ether-4,4'-disulfonyl chloride; diphenyl sulfide-4,4' - disulfonyl chloride, dibenzothiophen-2,8-disulfonyl chloride, dibenzofuran-3,7-disulfonyl chloride, and the like.

The silicon-containing aromatic substance that is the second component of the polymer-forming reaction mixture can contain one or more aromatic nuclei. The nucleus or nuclei can be heterocyclic, but is preferably carbocyclic, for instance a benzene or naphthalene nucleus. Preferred substances contain more than one aromatic nucleus and are such that each aromatic nucleus is bonded to a silicon atom or to another aromatic nucleus either directly or through an oxygen atom, and each silicon atom is bonded either directly to an aromatic nucleus or through an oxygen atom to an aromatic nucleus or to another silicon atom.

Provided replaceable hydrogen atoms are present, the aromatic silicon-containing substance can contain one or more nuclear substitutents. Such a substituent can be selected from a range of atoms and groups including for instance halogen atoms for example fluorine, chlorine or bromine, alkyl groups and alkoxy groups. Preferred aromatic compounds are however those that are unsubstituted or those having one or more halogen atoms as nuclear substituents.

A class of suitable silicon-containing substances where the arrangement of aromatic nuclei and silicon atoms is as defined above, and where the molecular structure is relatively simple are those having the formula:

$$R''_n Si(OR)_{4-n}$$

where R and R' are each an aromatic group especially an aryl or substituted aryl group, for instance a phenyl, naphthyl, biphenylyl or phenoxyphenyl group, and $n$ has a value of from 0 to 4, for example tetraphenyl silane, teraphenyl orthosilicate, diphenyl diphenoxy silane; and the aryloxyaryloxy silanes described in our British patent specification No. 953,421, for instance phenyl tri-(3-phenoxyphenoxy) silane, diphenyl di(3-phenoxyphenoxy) silane, triphenyl (3-phenoxyphenoxy) silane and disphenyl-2-thienyl (3'-phenoxyphenoxy) silane. Such compounds may contain, for example, up to 15 aromatic nuclei.

Of somewhat greater molecular complexity are (a) compounds of the formula:

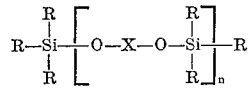

where R is an aryl or substituted aryl group, for instance a phenyl, naphthyl or biphenylyl group, X is an arylene radical, for instance a phenylene radical, and $n$ is an integer of from 1 to about 5, or about 6. Examples of such compounds are described in our British patent specification No. 947,653, for instance the three isomeric di-(triphenylsiloxy benzenes; diphenyl di(3-triphenylsiloxyphenoxy) silane; and 1,3-di(3'-triphenylsiloxyphenoxydiphenylsiloxy) benzene.

Also of somewhat greater complexity are the aromatic silicones, for example the cyclic aromatic siloxanes, such as for instance hexaphenylcyclotrisiloxane and octaphenylcyclotetrasiloxane, and the linear oligomers having the formula:

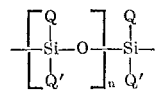

where Q and Q' each represent an aromatic group, especially an aryl or substituted aryl group, for instance a phenyl or naphthyl group, and $n$ is an integer of from about 3 to about 10.

Where the silicon-containing aromatic substance that is used to produce a polymer of the invention is one that already possesses a relatively highly polymeric structure, it can for example be itself a polymer of the invention that has been produced from a silicon-containing aromatic substance of relatively low molecular weight as described above. A particularly useful class of starting materials having a polymeric structure are polymers having molecules formed from repeating units of the formula:

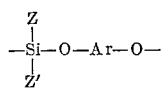

where Z and Z' each present a monovalent aromatic group especially an aryl or substituted aryl group, for example a phenyl, chlorophenyl or biphenylyl group, and Ar represents a divalent aromatic radical. Such condensation polymers can be obtained by the condensation of a diaromatic dihalosilane, for example diphenyldichlorosilane, with a dihydric phenol. They can be of various degrees of polymerization, varying in molecular weight from, for example, about 1,000 to about 10,000. The range of dihydric phenols that can be used includes compounds in which both hydroxyl groups are substituents in a single aromatic nucleus, for example the dihydroxybenzenes and dihydroxynaphthalenes, and dihydric phenols where the two hydroxyl groups are substituents in different aromatic nuclei, for example 4,4'-dihydroxybiphenyl and 4,4'-dihydroxydiphenylmethane. The divalent aromatic radical represented by Ar in the above formula can accordingly be mono- or polynuclear, for example an arylene or bis(arylene)methylene group.

As indicated above, the silicon-containing aromatic polymeric materials of the invention are of diffeeent types. At a given reaction temperature, the properties of the polymers vary with the duration of heating and the proportions of the reactants. During the early and intermediate stages of the polymerization process, the polymeric products are readily soluble in such solvents as chloroform, trichloroethylene, chlorobenzene, or xylene, and on cooling are viscous liquids, or solids having softening points of up to perhaps 150° C. Such polymeric products are conveniently termed intermediate polymers. As the polymerization proceeds, however, there is formed an insoluble fraction or gel, the proportion of which progressively increases, and the softening point of the polymer increases correspondingly.

Several procedures are available for operating the process for the production of the aromatic polymers. For example, the total quantities of the reactants to be used can be mixed initially, the sulfonyl halide can be added gradually or in stages to the aromatic compound, or a mixture of the sulfonyl chloride and a portion of the aromatic compound can be added gradually to the remainder of the aromatic compound. The isolation of one or more intermediate polymers is generally straightforward, especially when the sulfonyl chloride is added in stages, should such isolation be desired.

The overall ratios of reactants can vary from an amount of the aromatic silicon-containing substance equivalent to $n$ mols per mol of sulfonyl halide, where $n$ is the number of sulfonyl halide groups in the molecule of the aromatic sulfonyl halide, up to molar ratios of sulfonyl halide to aromatic silicon-containing substance of, for example, 10:1 or even more. For instance, equimolar amounts of the two reactants can be employed, or the molar ratio of sulfonyl halide to aromatic silicon-containing substance can lie within the range of from about 2:1 to about 5:1. However, as will be seen from the examples an excess of the aromatic silicon-containing substance may be employed with the aromatic polysulfonyl halide compound, e.g. up to about 2 mols thereof per mol of said aromatic polysulfonyl halide compound, but generally it is preferred that said aromatic polysulfonyl halide compound be employed in equimolar amounts or in a molar ratio to the silicon-containing composition of greater than 1, as hereinabove set out.

The properties of a polymer produced from an aromatic disulfonyl halide as the major aromatic sulfonyl halide reactant can be modified by including in the reaction mixture a proportion of an aromatic sulfonyl halide containing more than two sulfonyl halide groups, for example an aromatic trisulfonyl halide, or a proportion of a monosulfonyl halide.

A catalyst is not essential, but one can be used if desired, for example one of the catalysts for the arylation process described in our British patent specification No. 959,605. Copper and copper compounds, for example copper halides, are among the most effective catalysts. A catalyst is preferably used in an amount of from about 0.001 to about 0.1 mol per mol of the aromatic sulfonyl halide.

The ultimate polymers that are obtained by heating the aromatic sulfonyl halide and the aromatic compound for a sufficiently long time are infusible solids. These materials do not melt at any temperatures, and are stable for prolonged periods at temperatures of 250° C. or higher.

These infusible polymers are particularly valuable as binding agents for use with fibrous reinforcing materials in the production of articles having high mechanical strengths. Where advantage is taken of the high thermal stabilities of the polymers and the article is intended for use at high temperatures, the reinforcing material used is one which is itself refractory, for example glass fiber or preferably asbestos.

In the production of such an article, at least the final stage of the polymerization, that is to say the conversion of a substantially soluble intermediate polymer to the corresponding substantially insoluble and infusible polymer, is carried out in the presence of the reinforcing agent.

The usual procedure is to impregnate a mass of the fibrous material with a solution of a soluble polymer to which optionally a further quantity of sulfonyl halide has been added, and then to subject the composite body so obtained to an elevated temperature at which polymerization will continue. Preferably the intermediate polymer used is one having the highest degree of polymerization consistent with the solubility requirement.

The mechanical strength of articles so produced is often improved by further storage at an elevated temperature after conversion to the insoluble and infusible form of the polymer is substantially complete. During such storage the polymer may be said to undergo "post-curing." The elevated temperature can be substantially the same or within substantially the same range as that at which the polymerization reaction is carried out. The period of post-curing can be from several hours to a week or more, for example 12 hours, 2 days, or 4 days, or longer.

Preferred articles of high mechanical strength have a laminated structure. Such a structure can be formed by subjecting to pressure at polymerization temperatures an assembly of several superimposed sheets or mats of impregnated fibrous material. Pressures of for example from 25 p.s.i. to 750 p.s.i. and preferably from 50 to 600 p.s.i. can be used. The invention is illustrated by the following examples.

EXAMPLE 1

This example describes the production of a polymer from octaphenylcyclotetrasiloxane and benzene - 1,3 - disulfonyl chloride.

A mixture of 7.9 grams (0.01 mol) of octaphenylcyclotetrasiloxane and 2.75 grams (0.01 mol) of benzene-1,3-disulfonyl chloride was heated under reflux at 250° C. for 8 hours. Sulfur dioxide and hydrogen chloride were evolved. The temperature was then raised to 350° C. and the mixture was held under reduced pressure for 2.5 hours. The product was a light brown resin.

EXAMPLE 2

This example describes the production of a laminate by heating a condensation polymer of diphenyldichlorosilane and hydroquinone having a molecular weight of approximately 5,000 with benzene-1,3-disulfonyl chloride in the presence of asbestos.

A solution containing 9.1 grams (0.0018 mol) of the condensation polymer, 1 gram (0.0036 mol) of benzene-1,3-disulfonyl chloride and 0.006 gram of copper naphthenate in 25 cc. of chloroform was used to impregate a 6-inch square mat of chrysotile asbestos felt. After drying in air until most of the solvent had evaporated, the remainder was removed by heating the mat at 90° C. for 20 minutes. The mat was then cut into four 3-inch squares, these were placed one on top of another, and the assembly was then put into a press. The press was heated for 20 minutes at 265° C., the applied pressure being kept relatively low to allow fumes to escape. The temperature was then raised to 280–290° C. and the pressure to 200 pounds per square inch. These conditions were maintained for 2.75 hours giving a final product which after cooling was a strong hard board.

EXAMPLE 3

This example describes the production of a laminate by heating a condensation polymer of diphenyldichlorosilane and resorcinol having a molecular weight of approximately 6,200 with benzene-1,3-disulfonyl chloride in the presence of asbestos.

A solution containing 8.5 grams (0.0014 mol) of the condensation polymer, 1.5 grams (0.0055 mol) of benzene-1,3-disulfonyl chloride, and 0.006 gram of copper naphthenate in 31 cc. of chloroform was used to impregnate a 6-inch square mat of chrysotile asbestos felt. After drying in air, the mat was heated at 90° C. for 20 minutes and was then cut into four 3-inch squares. These were placed one on top of another and put in a press. The assembly was pressed lightly for 0.25 hour while the temperature was raised to 328° C. The pressure was then increased to 400 pounds per square inch and such pressure maintained while the temperature was controlled in the range 320–330° C. for 2.5 hours. The final product after cooling was a strong, hard laminate.

EXAMPLE 4

This example describes the production of a resin by heating a condensation polymer of diphenyldichlorosilane and resorcinol having a molecular weight of approximately 2,500 with benzene-1,3-disulfonyl chloride.

1.3 grams (0.0047 mol) of benzene-1,3-disulfonyl chloride were added to a stirred melt of 18.4 grams (0.0074 mol) of the condensation polymer in an atmosphere of nitrogen, and the mixture was then heated to 235° C. After 17 minutes at this temperature, the reaction mixture gelled, thus preventing further stirring. Heating at 235° C. under nitrogen was continued for a further 18 hours and in air for a further 73 hours.

At room temperature the product was a hard resin. Its high thermal stability was shown by the fact that at 400° C. its weight loss in air on a Stanton thermobalance was only 0.9% per hour over a 48-hour period.

EXAMPLE 5

This example describes the production of a laminate by the reaction of a condensation polymer of diphenyldichlorosilane and resorcinol having a molecular weight of approximately 1,100 with benzene-1,3-disulfonyl chloride.

A mixture of 50.4 grams (0.046 mol) of the condensation polymer, 9.53 grams (0.035 mol) of benzene-1,3-disulfonyl chloride and 0.004 grams of cuprous chloride was stirred under nitrogen at 230° C. Heating was discontinued after 11.5 minutes at the first signs of gel formation, 20.3% of the theoretical amount of sulfur dioxide and 31.8% of the theoretical amount of hydrogen chloride having been evolved.

The product was dissolved (substantially completely) in 300 cc. of chloroform, and the solution was used to impregnate an asbestos felt mat measuring 16 inches by 12 inches. The solvent was allowed to evaporate, and then six pieces, each 4 inches by 2 inches, were cut from the mat and placed one on top of another. The assembly was transferred to a press at 234° C. and after a warmup period of 3.5 minutes, a pressure of 50 pounds per square inch (gauge) was applied. These conditions were maintained for 2 hours, and the laminate was then post-cured in air at 240° C. for 2 days. Its flexural strength at room temperature was 24,000 pounds per square inch, and at 240° C., 19,000 pounds per square inch. After storing in air at 240° C. for a week, the flexural strength at 240° C. had increased to 22,000 pounds per square inch.

EXAMPLE 6

This example describes the production of laminates by heating a condensation polymer of diphenyldichlorosilane and resorcinol having a molecular weight of approximately 4,400, with two different proportions of benzene-1,3-disulfonyl chloride in the presence of asbestos.

(a) A mixture of 50.8 grams (0.0115 mol) of the condensation polymer, 6.4 grams (0.023 mol) of benzene-1,3-disulfonyl chloride and 0.004 gram of cuprous chloride was stirred under nitrogen at 230° C. Heating was discontinued at the onset of gellation (after 43 minutes at the reaction temperature) when 50% of the theoretical amount of sulfur dioxide and 45% of the theoretical amount of hydrogen chloride had been evolved.

After cooling, the product was dissolved in 240 cc. of chloroform and the solution was used to impregnate an asbestos felt mat measuring 16 inches by 12 inches. The solvent was allowed to evaporate, and then six pieces, each 4 inches by 2 inches, were cut from the mat and placed one on top of another. The assembly was transferred to a press at 235° C., and after a warm-up period of 3 minutes, a pressure of 550 pounds per square inch was applied and held for 2 hours. The laminate was then post-cured in air at 240° C. for 49 hours.

Its flexural strength at room temperature was 27,000 pounds per square inch, and at 240° C., 19,000 pounds per square inch. After storing in air at 240° C. for 1 week, the flexural strength at 240° C. had increased to 25,000 pounds per square inch.

(b) Starting from 47 grams (0.0107 mol) of the condensation polymer, and 23.7 grams (0.086 mol) of benzene-1,3-disulfonyl chloride and following essentially the same procedure as that described in (a) above, a laminate was obtained after 2 hours under pressure and a 48-hour post-curing period. The initial flexural strength of the laminate at room temperature was 29,000 pounds per square inch and at 240° C., 25,000 pounds per square inch. The flexural strength measured at room temperature after storage in air for 1 week at 240° C. was the same as the initial flexural strength.

It will be understood by those skilled in the art that the foregoing examples are illustrative only and are not restrictive of the subject disclosed invention.

We claim:

1. A thermally stable silicon-containing aromatic polymer produced by the reaction of (a) an aromatic sulfonyl halide compound containing at least 2 sulfonyl halide groups each linked to a nuclear carbon atom with (b) a silicon-containing aromatic composition containing at least 2 replaceable nuclear hydrogen atoms attached to aromatic nuclei to effect the condensation of the reactants with the evolution of sulfur dioxide and hydrogen halide, wherein the mol ratio of (a):(b) is within the range of from about 0.5:1 up to about 10:1; and the aromatic polymer chain is made up by a plurality of polyvalent radicals selected from the group consisting of aromatic radicals, —SiR₂—, —O—, —S—, and polyvalent heterocyclic radicals selected from the group consisting of dibenzofuran and dibenzothiophene, wherein R is an aromatic substituent directly linked to the Si atom, or linked thereto through an oxygen linkage; wherein the reaction is carried out at a temperature of from about 175° C. up to about 375° C. until the evolution of sulfur dioxide and hydrogen halide is substantially complete.

2. The thermally stable silicon-containing aromatic polymer composition of claim 1, characterized as a substantially insoluble and infusible polymeric composition.

3. The thermally stable silicon-containing aromatic polymer composition of claim 1, characterized in having a weight loss in air at 400° C. of less than 1 percent per hour over a 48-hour period.

4. Thermally stable reinforced compositions consisting of a heat-stable fibrous reinforcing agent selected from the group consisting of glass fiber and asbestos fiber and a silicon-containing aromatic polymeric composition of claim 1 as the bonding material therein.

5. A process for the production of a thermally stable silicon-containing aromatic polymeric composition having a molecular weight of at least 1000 which process comprises reacting (a) an aromatic sulfonyl halide compound containing at least 2 sulfonyl halide groups directly linked to a nuclear carbon atom of the aromatic moiety of said compound, wherein the said halide of the sulfonyl halide group is selected from the group consisting of chloride and bromide, with (b) a silicon-containing aromatic composition having at least 2 replaceable hydrogen atoms directly linked to a nuclear carbon atom of said aromatic composition in a mol ratio of (a):(b) within the range of from about 0.5:1 up to about 10:1, wherein the reaction is carried out at a temperature of from about 175° C. up to about 375° C., until the evolution of sulfur dioxide and hydrogen halide is substantially complete.

6. The process of claim 5, wherein from 1 to about 5 mols of the aromatic disulfonyl halide compound is employed per mol of the silicon-containing aromatic composition.

7. The process of claim 5, wherein from about 0.001 to about 0.1 mol of a copper catalyst is employed per mol of the aromatic sulfonyl halide compound.

8. The process of claim 5, wherein at least one of the aromatic sulfonyl halide and silicon-containing aromatic compound reactants contains a plurality of benzenoid rings which are joined together by at least one member selected from the group consisting of a direct monovalent linkage, a fused benzo ring, a fused furan ring, a fused thiophene ring, an ether group, and a thioether group.

9. The process of claim 5, wherein the aromatic sulfonyl halide is benzene-1,3-disulfonyl chloride and the silicon-containing aromatic composition is octaphenylcyclotetrasiloxane.

10. The process of claim 5, wherein the aromatic sulfonyl halide is benzene-1,3-disulfonyl chloride and the silicon-containing aromatic composition is a condensation polymer of diphenyldichlorosilane and hydroquinone which is characterized by having the following recurring structure:

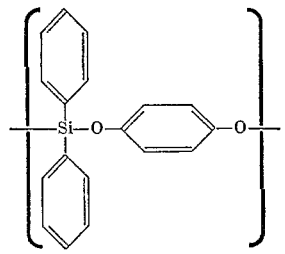

11. The process of claim 5, wherein the aromatic sulfonyl halide is benzene-1,3-disulfonyl chloride and the silicon-containing aromatic composition is a condensation polymer of diphenyldichlorosilane and resorcinol which is characterized by having the following recurring structure:

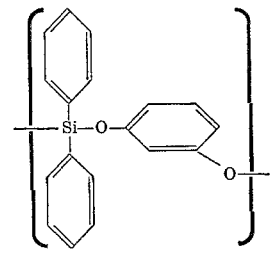

12. The process of claim 5, wherein the mol ratio of (a):(b) is within the range of from about 1:1 to about 5:1 and the reaction is carried out at a temperature of from about 200° C. up to about 350° C.

13. The process of claim 7, wherein the copper catalyst is copper naphthenate.

14. The process of claim 7, wherein the copper catalyst is cuprous chloride.

15. A process of producing the thermally stable reinforced composition of claim 4, comprising;
(a) impregnating the heat-stable fibrous reinforcing material with a solution of an intermediate-stage silicon-containing aromatic polymeric composition, and an aromatic sulfonyl halide compound containing at least two sulfonyl halide groups each linked to a nuclear carbon atom wherein said polymeric composition is still fusible,
(b) removing the solvent; and
(c) further polymerizing the polymeric composition to an infusible stage at a temperature of from about 200° to about 350° C. and a pressure of from about 25 p.s.i.g. to about 750 p.s.i.g.

16. The process of claim 15, wherein the heat-stable fibrous reinforcing material is asbestos.

17. The process of claim 15, wherein the heat-stable fibrous reinforcing material is glass fiber.

18. A soluble, intermediate-stage silicon-containing aromatic polymeric composition produced by the reaction of (a) an aromatic sulfonyl halide compound containing at least 2 sulfonyl halide groups each linked to a nuclear carbon atom with (b) a silicon-containing aromatic composition containing at least 2 replaceable nuclear hydrogen atoms attached to aromatic nuclei to effect the condensation of the reactants with the evolution of sulfur dioxide and hydrogen halide, wherein the mol ratio of (a):(b) is within the range of from about 0.5:1 up to about 10:1; and the aromatic polymer chain is made up by a plurality of polyvalent radicals selected from the group consisting of aromatic radicals, —SiR$_2$—, —O—, —S—, and polyvalent heterocyclic radicals selected from the group consisting of dibenzofuran and dibenzothiophene, wherein R is an aromatic substituent directly linked to the Si atom, or linked thereto through an oxygen linkage wherein the reaction is carried out at a temperature of from about 175° C. up to about 375° C. for a period of time sufficient to effect the condensation polymerization of said reactants with the evolution of sulfur dioxide and hydrogen halide.

19. A heat stable fibrous reinforcing medium impregnated with the soluble, intermediate-stage silicon-containing aromatic polymeric composition of claim 18.

20. A process for the preparation of a soluble, intermediate-stage silicon-containing aromatic polymeric composition which comprises reacting (a) an aromatic sulfonyl halide compound containing at least 2 sulfonyl halide groups directly linked to a nuclear carbon atom of the aromatic moiety of said compound, wherein the said halide of the sulfonyl halide group is selected from the group consisting of chloride and bromide, with (b) a silicon-containing aromatic composition having at least 2 replaceable hydrogen atoms directly linked to a nuclear carbon atom of said aromatic composition in a mol ratio of (a):(b) within the range of from about 0.5:1 up to about 10:1, wherein the reaction is carried out at a temperature of from about 175° C. up to about 375° C. for a period of time sufficient to effect the condensation polymerization of said reactants with the evolution of sulfur dioxide and hydrogen halide to provide a soluble polymeric composition.

No references cited.

MORRIS LIEBMAN, *Primary Examiner.*

J. E. CALLAGHAN, *Assistant Examiner.*